United States Patent [19]

Clarke, Jr.

[11] 3,763,414

[45] Oct. 2, 1973

[54] MULTI-SPEED DIGITAL TO SYNCHRO CONVERTERS

[76] Inventor: Arthur F. Clarke, Jr., Babylon, N.Y.

[22] Filed: Feb. 14, 1972

[21] Appl. No.: 225,721

[52] U.S. Cl. .......... 318/605, 318/654, 340/347 DA, 235/150.53, 235/151.3

[51] Int. Cl. .......... G05b 1/06

[58] Field of Search .......... 340/347 DA; 235/150.53, 151.3; 318/605, 573, 654

[56] References Cited

UNITED STATES PATENTS

| | | | |
|---|---|---|---|
| 3,587,091 | 6/1971 | Cooper | 340/347 DA |
| 3,226,617 | 12/1965 | Smith et al. | 340/347 DA X |
| 3,569,959 | 3/1971 | Arase et al. | 340/347 DA |
| 3,573,443 | 4/1971 | Fein | 235/150.53 |
| 3,588,882 | 6/1971 | Propster | 340/347 DA |

*Primary Examiner*—B. Dobeck
*Attorney*—James A. Eisenman et al.

[57] ABSTRACT

A reversible counter is used in conjunction with a plurality of gates and an impedance network to develop a staircase output having a phase corresponding to the count initially registered. This output is then converted into an AC signal of corresponding phase for use in controlling synchros and the like. By overlapping the output of these converters, one is able to achieve greatly increased resolution in the same manner that multi-speed synchro systems are employed.

8 Claims, 8 Drawing Figures

MULTI-SPEED DIGITAL TO SYNCHRO CONVERTERS

BACKGROUND OF THE INVENTION

1. Field of the Invention

This invention relates to systems for converting data from a first to a second form, and more particularly it relates to systems for using digital data to control synchros.

2. Description of the Prior Art

One of the most frequently encountered uses of digital to analog converters is in connection with the control of positioning apparatus and machine tools. In these systems, one may employ input data in digital form and convert it to a form wherein the phase is determined by the digital data. This phase data is then used to control resolvers or synchros which are geared or linked to the apparatus to be controlled. Among the many systems developed, one finds a variety of pulse generating and utilization arrangements. Each of these systems share in common the problem of converting digital input data into analog output data having the same resolution or accuracy as exhibited by the input data.

When concerned with the positioning of machine tools, the input should be usable for either absolute positioning, wherein the tool is adjusted to correspond with a specific number registered in digital form, or for contour positioning, wherein the tool follows a controlled path in accordance with the speed and positioning data that is continually being stored and updated in an input register.

SUMMARY OF THE INVENTION

The present invention provides a digital to analog conversion system that can be used for both absolute positioning systems and contouring control systems.

It is an object of the present invention to provide an improved digital to analog converter that produces an absolute output position in analog form, in response to the registration of digital data in an input register.

It is another object of the invention to provide an improved digital control system for synchros and the like.

It is yet another object of the present invention to provide an improved digital to analog conversion system which provides an analog output of varying phase in response to activation of a register counter by a plurality of sequentially supplied pulses.

It is yet another object of the present invention to provide a digital to synchro converter, adaptable for operation in response to data received in any digital form, e.g. binary or binary coded decimal.

Still another object of the present invention is to provide a circuit for the conversion of digital to analog data which can be cooperatively interconnected with a corresponding circuit in order to develop a multi-speed converter wherein the outputs correspond to accuracies of varying resolution or granularity of control information.

In accordance with one aspect of the invention, there is provided a reversible counter operative to sequentially increase the number stored therein in response to a plurality of input pulses. Logic gates associated with selected stages of this counter produce a plurality of outputs as the input signals are received. An impedance ladder network is supplied by these outputs and is operative to provide a staircase signal having two complete cycles responsive to one complete counting cycle. This staircase output is utilized to develop a sine wave having a phase corresponding to the number stored in the register at commencement of operation.

In accordance with another aspect of the invention there is provided a system of the nature referred to above wherein several converters are arranged with over-lapping stages. The outputs of each of these units is then connected to control transformers of varying degrees of resolution, which in turn control the position of a motor or similar element.

A more detailed understanding and appreciation of this invention and its features will be available from the following description of the preferred embodiment which is taken in reference to the various drawings.

BRIEF DESCRIPTION OF THE DRAWINGS

Basically, FIG. 1 illustrates a forward-backward or reversible counter 10 having the first eleven stages thereof connected via logic gates 11 to a resistor ladder network 12. Counter 10 comprises twelve binary stages each of which are operative to provide a binary output on one of two leads in accordance with the particular state of the stage. This is illustrated by the two output leads shown on the right of each stage and labeled Q, $\overline{Q}$. For convenience, only representative stages of the counter 10 have been illustrated. These stages are numbered 30, 31, 32, 33 and 34. Broken lines 35 and 36 indicate the presence of the non-illustrated stages.

Figures 1, 1A, 2, 2A:
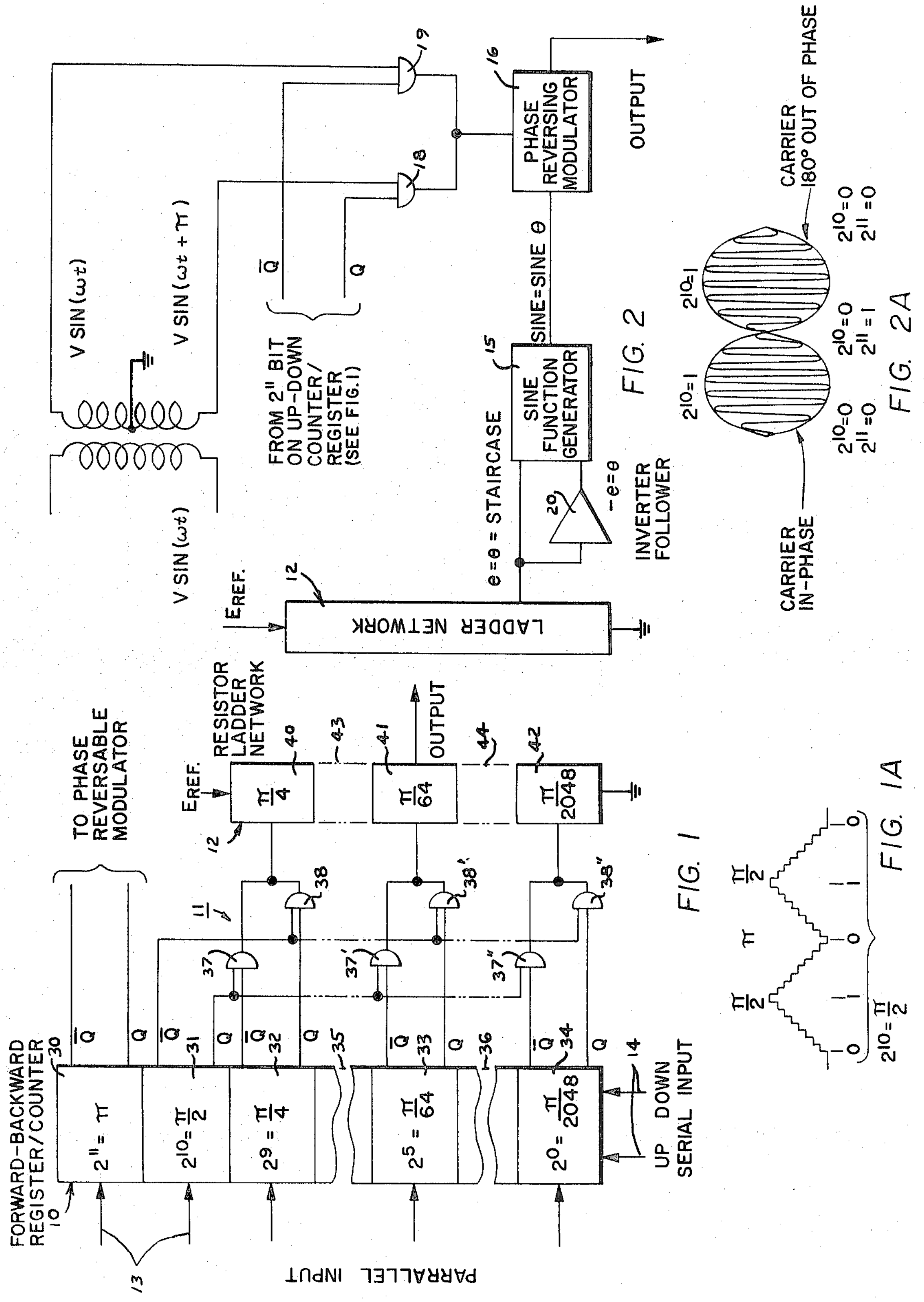
FIG. 1 is a block schematic of a digital to analog converter embodying the features of the present invention.
FIG. 1A illustrates a typical waveform produced at the output of the circuitry shown in FIG. 1.
FIG. 2 is a block schematic illustrating utilization of the output from FIG. 1 to produce a synchro control signal.
FIG. 2A illustrates a typical waveform produced at the output of the circuit of FIG. 2.

Counter 10 is arranged for binary operation and accordingly each stage may be designated as a power of two with the most significant bit represented in the register being $2^{11}$. The least significant bit is designated $2^0$. Considering the rating of each stage as designated, and recognizing that the numbers registered in this counter will represent time or vector rotation, one may value the weight of a registration in the most significant stage as being equivalent to radians and in the less significant stage as being equivalent to $\pi/2{,}048$ radian.

In known manner, counter 10 may register a number initially in response to a parallel input upon leads 13, or it may register numbers in ascending or descending order as it is supplied sequentially with a serial input on the up or down leads 14, respectively.

Logic gates 11 comprise a plurality of two input AND gates 37, 38. One input of each gate is connected to one output of each stage of counter 10. For purposes of explanation, it will be assumed that the Q outout of each stage is the "set" output, and the $\overline{Q}$ output of each stage is the "reset" output. With this assumption, it will be seen that logic gates 38, 38′, and 38″ have one input connected to the set outputs of their corresponding stage AND gates 37, 37′, and 37″ have one input connected to the reset outputs of their corresponding stage. The remaining inputs of the AND gates 38, are connected to the reset outputs of the eleventh stage, 31 ($2^{10}$). The remaining inputs of the AND gates 37, are connected to the set outputs of eleventh stage, 31, ($2^{10}$). The outputs of the AND gates associated with each stage, e.g., 37, 38, are connected together and to resistor ladder network 12. The resistor ladder network 12 is of common configuration, having a plurality of interconnected impedances 40, 41, 42, etc. (missing elements being noted by dotted lines 43, 44). The network is supplied with a DC voltage at one end and it may be grounded at the other.

By means of the logic gates 11, the number registered in counter 10, or its complement, can be selected as an output. The operation of this circuitry may be understood by considering that the counter is initially cleared and then serial input pulses are applied to the up input lead 14. The binary stages of counter 10 being to register each input pulse with ascending counts. As a result of the DC voltage applied as a reference signal to the register ladder network 12, an increasing staircase voltage will appear on the output of the ladder network until the eleventh bit ($2^{10}$) is reached, and stage 31 is set. When stage 31 is set, the enablement of the AND gates 11 is reversed.

It will be seen that during the initial ascending count, with the eleventh stage in a reset condition, AND gates 38, 38′, and 38″ will each be enabled as the corresponding stages are set. This will produce outputs from each of these gates to the input of the resistor ladder network and thereby generate the described staircase voltage. This is illustrated in FIG. 1A, in the interval from 0 to 1. As the count proceeds beyond this point, AND gates 37, 37′, 37″ will be successively enabled resulting in the descending voltage output from ladder network 12 as the count continues to increase. Subsequently, when the eleventh stage ($2^{10}$) is again reset due to the increasing count registration, AND gates 37 will be disabled and AND gates 38 will be reenabled, creating a new ascending staircase voltage output from ladder network 12.

A continuously applied series of input pulses on up input 14, will generate the waveform shown in FIG. 1A. When these voltages and the stages are considered representative of rotation of a vector, it will be seen that the staircase envelope is repeated every 2″ pulses, or every $\pi$ radians.

It remains to convert this staircase voltage into a suitable sinewave for utilization with a synchro. This can be effected by the utilization of commercially available sine function generators. FIG. 2 illustrates such a circuit. In FIG. 2 the sine function fitter 15 drives a phase-reversing modulator 16 that is further controlled by the twelfth stage output of the counter 10. It will be seen that the output of ladder network 12 represents the staircase voltage e, which in turn may be considered equivalent to angle $\theta$ . This output is inverted by inverter follower 20 and both the original and inverted outputs are supplied to as inputs to sine function generator 15. The output of sine function generator 15 represents the sine of the input voltage, or sine $\theta$ . This signal is then applied as one input to phase reversing modulator 16. An alternating current carrier is applied to the other input of phase reversing modulator 16 from center-tapped transformer 17. The primary of this transformer receives an input signal V sin($wt$), thus the opposite sides of the center-tapped secondary produce the signals V sin($wt$) and V sin ($wt + \pi$ ), respectively. These two outputs are anded via gates 18 and 19 with the set and reset outputs respectively from the twelfth stage 30, of counter 10. Accordingly, when the twelfth stage is in a reset condition, the phase applied to the modulator is the same as that of the alternating current carrier and when the twelfth stage is in a set condition, the phase applied to the modulator is 180° out of phase with the carrier. As illustrated in FIG. 2A, the output of the phase-reversing modulator 16 is an amplitude modulated, phase-reversible sinewave that corresponds to one input of a four wire synchro control transformer.

Figure 3:
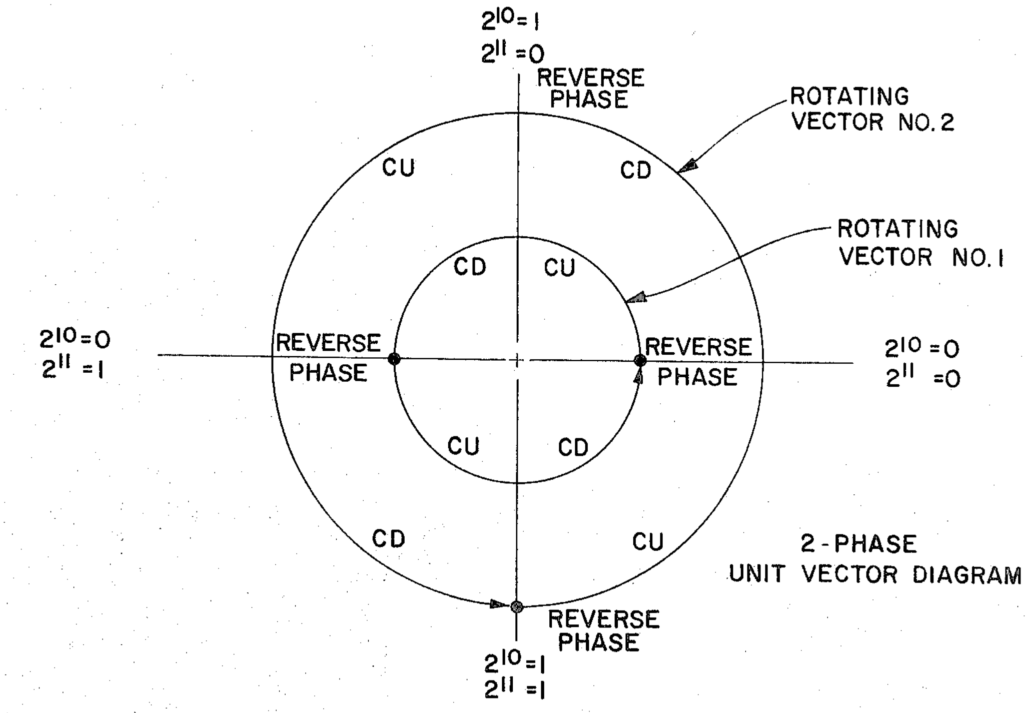
FIG. 3 is a vector diagram illustrating the two phase vector output produced by a digital to synchro converter embodying features of the invention.

FIG. 3 illustrates the manner in which a signal corresponding the second input of a four wire synchro may be developed. This figure is a two-phase rotating vector diagram with two unit vectors displaced by 90° ($\zeta$ /2) in phase position. The second vector must be counting up, while the first vector is counting down, and the second vector must count down when the first vector counts up. In addition, the second vector must change its phase at 90° and 270° instead of at 0° and 180°. These conditions can be satisfied for the second vector if it is produced by using the eleventh and twelfth stages of counter 10 (i.e., $2^{10}$and $2^{11}$ bits) just as these two stages were used to generate the first unit vector.

Figure 4:
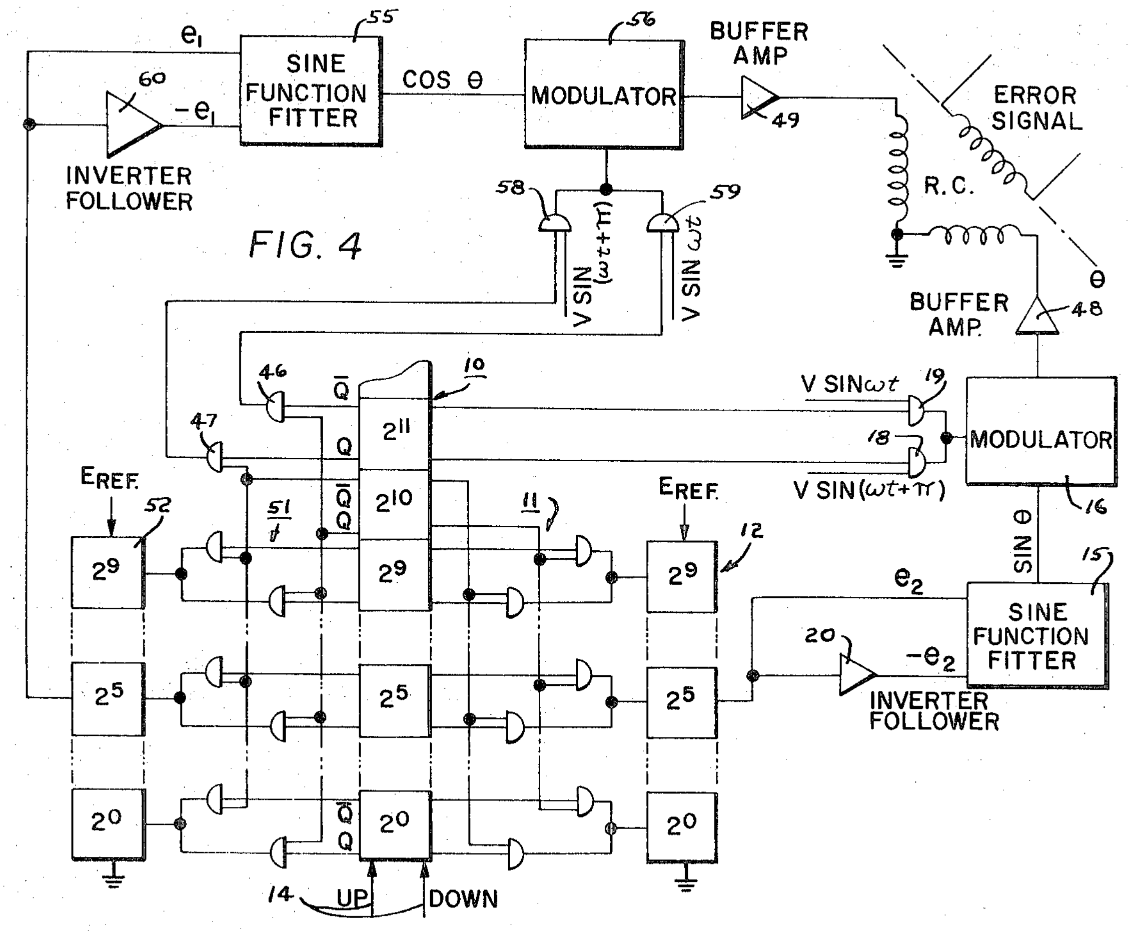
FIG. 4 is a block schematic of the circuit used to generate the signals represented by the vectors of FIG. 3.

FIG. 4 shows that the circuitry described in connection with FIGS. 1 and 2 may be substantially duplicated to produce the second vector, while employing the same basic reversible counter 10. Thus, FIG. 4 includes a second set of logic gates 51, a second resistor ladder network 52, another sine function generator 55, and another modulator 56, in order to develop a voltage that is 90° out of phase with that produced by initial circuitry described. The interconnections between counter 10 and logic gates 51 differ from those described above in connection with logic gates 11, in that the set outputs of the eleventh stage ($2^{10}$) are anded to the set outputs of each of the preceding stages and the reset output of the eleventh stage ($2^{10}$) is anded to the reset outputs of each of the preceding stages. Thus, the output of logic gates 51 and associated resistor ladder network 52 counts up when the output of the first set of gates 11 counts down, and vice versa.

In order to obtain phase reversal at 90° and 270°, the set output of the eleventh stage ($2^{10}$) is anded with the reset output of the twelfth stage ($2^{11}$), at gate 46 and the reset output of the eleventh stage ($2^{10}$) is anded with the set output of the twelfth stage ($2^{11}$) at gate 47. As described hereinbefore relative to the initial circuitry, the sawtooth output from resistor ladder network 52 is applied to a sine function fitter 55 and thence to a modulator 56 in order to generate the desired modulated carrier. In view of the difference in phase between the output of network 52 and network 12, the output of sine function fitter 55 is in fact co sine $\theta$ rather than sine $\theta$ . This is the 90° difference in phase that has been sought. Modulators 16 and 15 are shown connected via buffer amplifiers to the first and second inputs of a four wire synchro. It will be apparent that one may effect an error signal in the synchro by inserting a parallel input into register counter 10 commensurate in magnitude with the error desired.

Figure 5:
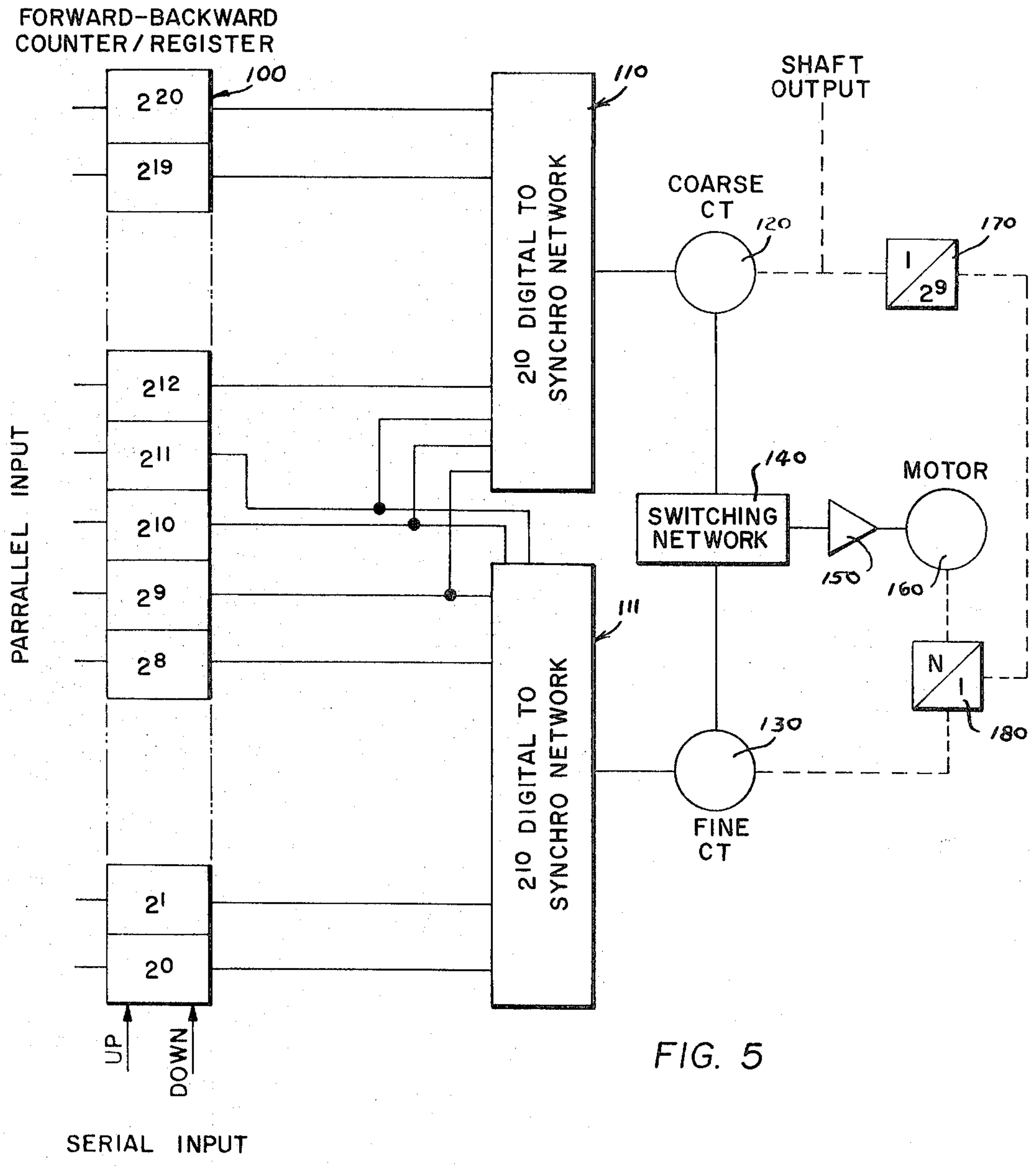
FIG. 5 is a block schematic of a two-speed synchro system utilizing the analog to synchro converters embodying the invention.

The circuitry of the present invention is ideally suited for overlapping in order to increase accuracy of digital to synchro conversion, or in other words, to increase the resolution of information available at an output synchro. FIG. 5 illustrates a two-speed synchro system. The diagram is simplified by showing only one signal or vector output and is further simplified by depicting only illustrative stages of a reversible counter 100 and what have been labeled as synchro networks 110, 111. The synchro networks 110, 111 represent the logic gates, the ladder networks and the output circuitry associated therewith including the sine function fitters and modulators.

The counter 100 is shown to comprise 21 stages. In fact, this counter may be considered to be made up of two counters, the first comprising twelve stages and the second comprising twelve stages. In order to produce the single counter, however, the three most significant bits of the lower counter are merged with the three least significant bits of the upper counter. This is shown by stages $2^9$, $2^{10}$, and $2^{11}$ in FIG. 5. The lower counter supplies synchro network 111, which is indicated as receiving the data for the first eleven bits and similarly the upper eleven stages are connected to synchro network 110.

When a digital number is placed in the counter, the error signal from a course controlled transformer 110 is amplified to drive servo motor 160 via switching network 140 and amplifier 150, in well understood fashion. Thus, the control transformer is rotated until its output error voltage is zero and normally the motor would stop. When the switching network senses a zero output from the course control transformer 120, control is transferred to fine control transformer 130 which thereupon drives motor 160 which via its shaft continues to drive both control transformers until the error voltage is zero as determined by the finer resolution of the fine control transformer 130. At this time, motor 160 stops and the shaft output corresponds to the number in the register 100.

As a result of the amount of overlap shown, the fine control transformer has control from 45° ($\pi/4$) to null. Any time the error exceeds 45° on the fine control transformer 130, the switching network will transfer control to the course transformer 120. Having achieved synchronization, the fine control transformer 130 would retain control unless a large error is introduced into counter 100. It will be seen that if one supplies a serial input pulse train to register 100, the output of this network, via amplifier 150, will cause a tracking of the pulse input at a speed proportional to the frequency of the pulse input. Inasmuch as this is the case, the converter can be conveniently used not only for positioning controls, but also contouring controls.

The system shown in FIG. 5 can of course be expanded by adding another synchro in order to reduce the gear ratio between each control transformer and thereby increase the resolution of the output. On the other hand, the gear ratio and resolution may be decreased by further overlapping the ladder networks, or by reducing the number of bits in the ladder networks.

Quite clearly, the size and amount of overlap is flexible and may be varied to suit the system designer's requirements. In addition, it will also be clear that although the system has been described in connection with a purely binary operation, other numbering systems may be employed including binary coded decimal arrangements. It is simply necessary to convert both the counter and output circuitry to operate within the particular systems being considered.

Figure 6:
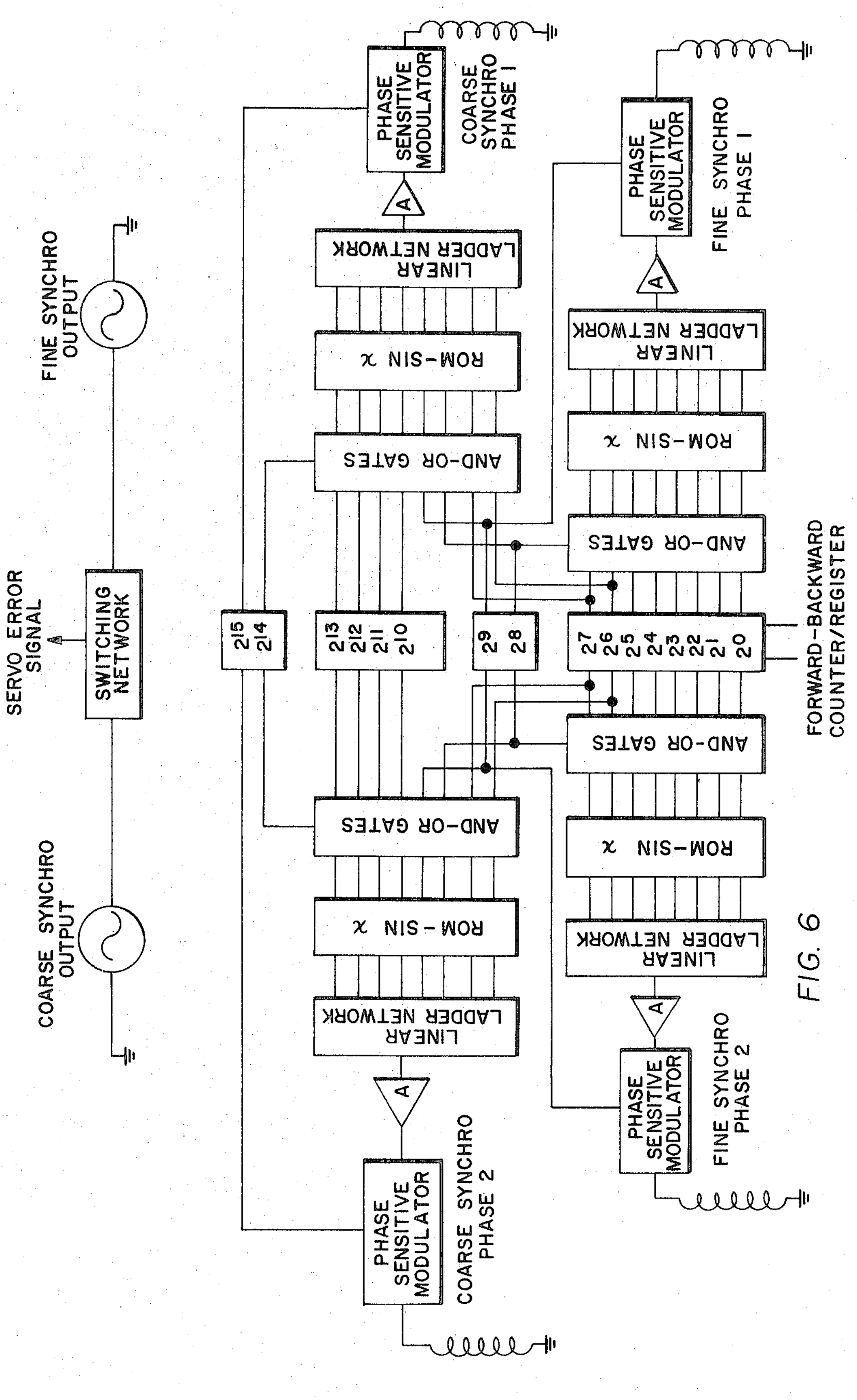
FIG. 6 is a block schematic of a multi-speed digital to synchro converter circuit using sine function Read-Only-Memory units.

FIG. 6 is presented in order to illustrate an embodiment of the invention utilizing Read-Only-Memory sine function generators, rather than the sine function fitter described above. When this is the case, one may employ a linear ladder network on the output of the Read-Only-Memory circuitry. With this exception, the previous discussion remains applicable.

One advantage of the system, which will be apparent by consideration of FIG. 6, lies in the fact that one may multiplex the circuitry in order to eliminate the relatively redundant circuit elements making up the logic gages, the Read-Only-Memory function generators, and the linear ladder networks. This may be done expeditiously by the introduction of sample and hold networks to store the numbers generated during each plase of operation.

A number of illustrative embodiments of the invention have been shown and described. In addition, several specific variations and modifications have been suggested. Other modifications should be apparent to those skilled in the art and any such modifications coming within the scope of the appended claims are intended to be covered thereby.

What is claimed:

1. A digital to analog converter comprising counting means, an impedance ladder network, gating means for selectively connecting inputs to said network corresponding to both the number registered in said counting means and the complement thereof, and means for producing a voltage corresponding to the sine of the voltage produced by said network.

2. A digital to analog converter as defined in claim 1, including a second impedance ladder network, second gating means for selectively connecting inputs to said network corresponding to both the number registered in said counting means and the complement thereof, means for producing a voltage and corresponding to the sine of the voltage produced by said second network, and means whereby the number in said counting means is gated to the first network when the complement of said number is gated to said second network, and vice versa.

3. A digital to analog converter as defined in claim 1, wherein said counting means comprises a plurality of N binary stages each having complementary outputs representing the state of the stage, said gating means being connected to produce an output representing the number stored in the first (N minus 1) stages when said N stage is in a first condition, and operative to produce an output corresponding to the complement of the numbers stored in said first (N minus 1) stages when said N stage is in the other condition.

4. A digital to analog converter as defined in claim 2, wherein said counting means comprises a plurality of N binary stages each having complementary outputs representing the state of the stage, the first mentioned gating means being connected to produce an output representing the number stored in the first (N minus 1) stages when said N stage is in a first condition, and operative to produce an output corresponding to the complement of the numbers stored in said first (N minus 1) stages when said N stage is in the other condition, and said second gating means being connected to produce an output representing the number stored in the first (N minus 1) stages when said N stage is in said other condition, and operative to produce an output corresponding to the complement of the numbers stored in said first (N minus 1) stages when said N stage is in said first condition.

5. A digital to analog converter according to claim 1 including a second impedance ladder network and second gating means for selectively connecting inputs to said second network, corresponding to both the number registered in said counting means and the complement thereof, and second means for producing a voltage corresponding to the sine of the voltage produced by said second network, a plurality of consecutive intermediate stages of counting means being connected through both said first and said second gating means, whereby said intermediate stages function as the most significant stages of a fine resolution counting means and as the least significant stages of a coarse resolution counting means.

6. A digital to analog converter according to claim 1 comprising second counting means, a second impedance ladder network, and second gating means for selectively connecting inputs to said second network, corresponding to both the number registered in said counting means and the complement thereof, a plurality of consecutive stages of the first mentioned counting means representing the least significant data therein, being identical to a corresponding plurality of consecutive stages in the second counting means, corresponding to the most significant data therein, whereby said plurality of stages are connected in common to both the first mentioned gating means and said second gating means.

7. A digital to analog converter as defined in claim 5, including corresponding third and fourth gating means interconnected with third and fourth impedance ladder networks and respective means for producing voltages corresponding to the sine of the voltages produced by said third and fourth networks, the outputs of said first mentioned network and said second network being connected to drive a coarse synchro and fine synchro respectively and the outputs of said third and fourth networks being operative to drive a second coarse synchro and second fine synchro respectively, said coarse synchro and said fine synchro being 90° out of phase with said second coarse synchro and said second fine synchro.

8. A digital to analog converter as defined in claim 1, including storage means operative to store a signal corresponding to the output of said last mentioned means, and means operative to successively store data in said counting means and initiate a count cycle thereof.

* * * * *